(12) United States Patent
Chakraborty et al.

(10) Patent No.: US 6,549,853 B2
(45) Date of Patent: Apr. 15, 2003

(54) METHOD FOR DETERMINING SEAFLOOR ROUGHNESS USING MULTIBEAM ECHOSOUNDER

(75) Inventors: Bishwajit Chakraborty, Goa (IN); Vijay N. Kodagali, Goa (IN)

(73) Assignee: Council of Scientific & Industrial Research, New Delhi (IN)

( * ) Notice: Subject to any disclaimer, the term of this patent is extended or adjusted under 35 U.S.C. 154(b) by 46 days.

(21) Appl. No.: 09/814,104

(22) Filed: Mar. 22, 2001

(65) Prior Publication Data

US 2002/0173916 A1 Nov. 21, 2002

(51) Int. Cl.$^7$ .................................................. G01V 1/28

(52) U.S. Cl. ............................................ 702/14; 367/88

(58) Field of Search .......................... 702/14, 17, 5; 367/24, 21, 88, 103, 119

(56) References Cited

U.S. PATENT DOCUMENTS 4,232,380 A  * 11/1980  Caron et al. .................. 367/88
5,485,432 A  *  1/1996  Aechter et al. ............... 367/88

OTHER PUBLICATIONS

Chakraborty et al., "Seabottom Characterization Using Multibeam Echosounder Angular Backscatter: An Application of the Composite Roughness Theory", IEEE Transactions On Geoscience And Remote Sensing, vol., 38, No. 5, Sep. 2000, pp. 2419–2422.*

Chakraborty et al., "Seabottom Backscatter Studies In The Wester Continental Shelf Of India", Jornal of Sound and Vibration, Jan. 1999, pp. 51–62.*

* cited by examiner

*Primary Examiner*—Donald E. McElheny, Jr.
(74) *Attorney, Agent, or Firm*—Sughrue Mion, PLLC

(57) ABSTRACT

The present invention provides a method for determining sea floor roughness using multibeam echosounder, said method comprising providing backscatter, bathymetry and multibeam operational parameters; removing system gain from the backscatter data to obtain real seafloor backscatter data; calculating across track seafloor slope; incorporating correction factor in actual beam arrival angles; calculating seafloor area; measuring backscatter strength; obtaining backscatter strength data at 1° angle; obtaining power law parameters; using the above-obtained parameters in a seafloor roughness power law model; splicing the multibeam backscatter data; including sediment volume roughness model; and verifying the validity of the composite roughness model.

15 Claims, 4 Drawing Sheets rms raw signal $V_{TVC}$ gain processed backscatter strength

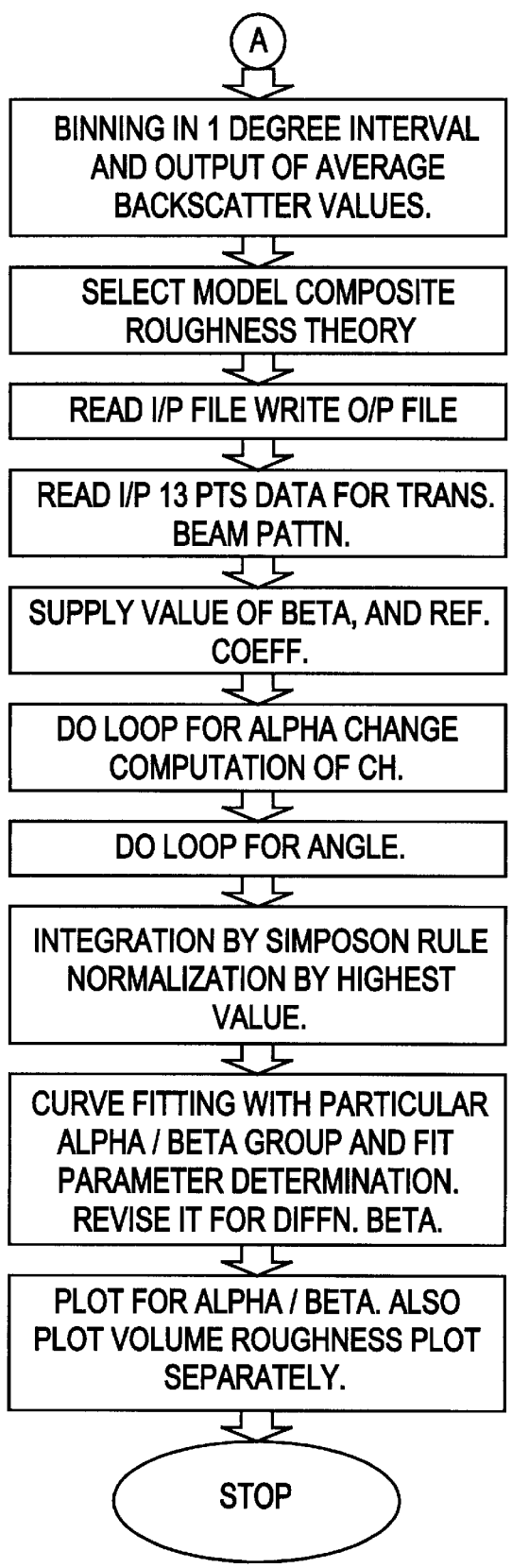

METHOD FOR DETERMINING SEAFLOOR ROUGHNESS USING MULTIBEAM ECHOSOUNDER

FIELD OF THE INVENTION

The present invention provides a method for determining the sea floor roughness using multibeam echosounder. The present invention also provides a method to precisely determine the beam incident angle at the sea-bottom and in consequence, acoustic backscatter data to be unambiguously related to the nature of the sea-bottom.

BACKGROUND AND PRIOR ART REFERENCES TO THE INVENTION

Multibeam sounding systems are widely used for bathyretric mapping and also have potential to provide quantitative backscatter information which can be used to classify the seabottom roughness. Because of narrow multibeam geometry, the angular dependence of the acoustic backscatter can be derived, and accurate quantitative estimate of backscatter is possible along with bathymetry. The changes in the backscatter strength for different survey areas can be compared for the same incidence angles using the shape parameters of the backscatter curves. Before initiating any model study using multibeam angular backscatter information, corrections in terms of system gain, is an important step to be carried out. Using multibeam bathymetry, accurate measurement of the bottom slopes is also possible, which can be used to compute backscatter strength for the determination of correct angle of incidence. Also, bottom insonification area normalization is an important factor to be employed before carrying out any seabottom characterization.

The multibeam systems have larger seafloor coverage when compared to the single beam system. Hence, in coming future many fold increases in the use of multibeam system is expected in comparison with the single beam system. In the multibeam processing system, the received electrical envelopes at the bottom echo processor are sampled and converted to rms voltages. Techniques for seafloor classification are still maturing and multibeam backscatter data and bathymetry data will play a significant role in the development of these techniques.

A reference may be made to Anonymous, (1993), "Atlas Hydrosweep DS—Interface specifications: Magnetic Tape Recording and data for Backscattering Analysis", STN Atlas Elektronik BmgH, Bremen.

A reference may be made to De moustler, C. and Alexaondrou, D., (1991). Angular dependence of 12 KHz. Seafloor acoustic backscatter . Jour. Acoust. Soc. America., 90: 531–533.

A reference may be made to Jackson, D. R, D. P. Winebreuner, and A. Ishimaru, (1986). Application of the Composite roughness model to high frequency Bottom backscattering, Jour. Acoust. Soc. America., 79: 1410–1422.

A reference may be made to Anonymous, (1999), "Cruise Report of OVR Sagarkanys-Cruise Number SK-140 -B", National Institute of Oceanography, Dona Paula, Goa, India.

A reference may be made to Talukdar, K. K. and R. C. Toyce, (1 991), "Digital Processing of sidescan images from bottom backscatter data collected by Sea Beam", Mar. Geodesy, 14, 81–100.

OBJECTS OF THE INVENTION

The main object of the present invention is to provide a method for determining seafloor roughness using multibeam echosounder.

SUMMARY OF THE INVENTION

The present invention provides a method for determining sea floor roughness using multibeam echosounder, said method comprising providing backscatter, bathymetry and multibeam operational parameters; removing system gain from the backscatter data to obtain real seafloor backscatter data; calculating across track seafloor slope; incorporating correction factor in actual beam arrival angles; calculating seafloor area; measuring backscatter strength; obtaining backscatter strength data at 1° angle; obtaining power law parameters; using the above-obtained parameters in a seafloor roughness power law model; splicing the multibeam backscatter data; including sediment volume roughness model; and verifying the validity of the composite roughness model.

DETAILED DESCRIPTION OF THE INVENTION

Accordingly, the present invention provides a method for determining sea floor roughness using multibeam echosounder, said method comprising:

(i) providing backscatter, bathymetry and multibeam operational parameters;
(ii) removing system gain from the backscatter data to obtain real seafloor backscatter data;
(iii) calculating across track seafloor slope;
(iv) incorporating correction factor in actual beam arrival angles;
(v) calculating seafloor area;
(vi) measuring backscatter strength;
(vii) obtaining backscatter strength data at 1° angle;
(viii) obtaining power law parameters;
(ix) using the above-obtained parameters in a seafloor roughness power law model;
(x) splicing the multibeam backscatter data;
(xi) including sediment volume roughness model; and
(xii) verifying the validity of the composite roughness model.

In an embodiment of the present invention, the primary backscatter parameters recorded by the system are echo rms voltage and signal duration for each beam.

In yet another embodiment of the present invention, the overall signal processing gain ($V_{Tot}$) consists of matching circuits gain ($V_{Match}$), range related gain or Time varied correction gain ($V_{TVC}$), beamformers gain ($V_{BF}$) and filter gain ($V_{Filt}$).

$$V_{Tot} = V_{Match} + V_{TVC} + V_{BF} + V_{Filt} \tag{I}$$

In still another embodiment of the present invention, the matching circuit gain is the gain provided by each transducer group.

In one another embodiment of the present invention, the range related gain or Time Varied Correction Gain is calculated using equations given in Anon, 1993.

In one more embodiment of the present invention, the range related gain consists of gain compensation due to signal travel through the water media and attenuation corrections and starting gain.

In an embodiment of the present invention, the starting gain $V_{TVC}$ comprises of preamplifier gain ($V_v$), user selected TVC ($V_{corr}$) and system related offset gain ($V_{off}$).

In another embodiment of the present invention, the across track seafloor slope is calculated using bathymetry data.

In yet another embodiment of the present invention, the across track seafloor slope is calculated to incorporate correction factor in actual beam arrival angles.

In still another embodiment of the present invention, the bottom slope values with respect to each beam are computed using tangent inverse of the ratio between depth and lateral distance difference.

In one another embodiment of the present invention, the seafloor area is calculated based upon angle of incidence and bathymetry.

In one more embodiment of the present invention, the bottom sea surface area is calculated using the formula $$A = A_b \exp[-(\phi/\phi_x)^2] + A_p\{1 - \exp[-(\phi/\phi_x)^2]\} \quad \text{II}$$

In an embodiment of the present invention, the actual echo root mean square level is calculated using DeMoustier and Alexandrou Formula (1991).

$$<20 \log_{10} RL(\phi)> = SL + <10 \log_{10} S_B(\phi)> - 40^*\log_{10}(R) - 2\alpha_b R + 10 \log_{10} A \quad \text{III}$$

In another embodiment of the present invention, the backscatter strength data at 1° angle is obtained by bining each beam at 1° angular bins and averaging the number of samples in each bin for steady areas.

In yet another embodiment of the present invention, the power law parameters are obtained by reading the measured backscatter data and subjecting it to curve fitting.

In still another embodiment of the present invention, Helmholtz-Kirchhoff approximation is used to determine interface roughness of the seabed.

In one another embodiment of the present invention, the splicing is done using Helmholtz-Kirchoff and Rayleigh-Rice theories.

In one more embodiment of the present invention, the incidence angle of 20° is used for splicing.

In an embodiment of the present invention, the sediment volume roughness inodel is created by curve fitting the entire measured angular backscatter data.

In another embodiment of the present invention, matching the theoretical curve with the measured backscatter data does the verification.

Seafloor roughness studies using bathymetry provides geometrical shapes of the seafloor features. The determination of the texture aspect together with the seafloor features may be made by use of multibeam backscatter signal. Estimated seafloor roughness related parameters using modeled angular backscatter data are more important than bathymetry data. Use of composite roughness theory based model of Jackson et al, (1986) along with the processes angular backscatter strength has ample scopes.

High acoustic frequency (10 kHz–100 kHz) based profiling of the seafloor roughness include two basic types of roughness. They include water to seafloor interface roughness and sediment volume roughness parameters. Through use of power law parameters, determination of the parameters like: large scale roughness parameters of the seafloor i.e., root mean square(rms) slope and Radius of curvatures may be made. Similarly, small-scale roughness of the surveyed seafloor determined which is designated as rms relief height. The estimated volume roughness parameter is a ratio between the sediment volume scattering and attenuation coefficient is determined using this model. Based on the above computed results using estimated power law parameters, different survey areas can be systematically characterized.

The present invention provides a system of backscatter echo data processing and seafloor roughness estimation (power law parameters) providing appropriate theories to deal with the newly developed expanded multibeam data sets.

The approach adopted in the present invention for estimating water to seafloor interface roughness is to use the Helmholtz-Kirchoff interface scattering theory up to 15°, and the more relevant Rayleigh-Rice perturbation theory for incidence angles beyond this. The splicing technique adopted between the theories is an indicator of the success of the composite roughness theory using multibeam.

Scattering beyond 20° is a composite of scattering from water-seafloor interface and volume scattering from sediments. The composite roughness theory can successfully be used to determine sediment volume roughness using expanded form of multibeam system and the presently proposed system.

Development of on-line system is underway to obtain seafloor roughness classification in real time. These systems can provide useful support to marine geologist to make instant decisions about the seafloor sediment sample collection and considerable savings of time.

BRIEF DESCRIPTION OF THE ACCOMPANYING DRAWINGS

In the drawings accompanying the specification,

FIGS. 1A–C represents graphs between $U_A$, $V_{TVC}$, and $S_B$ with respect to the angles for deeper water areas of Arabian Sea.

FIGS. 3A and 3B represents the flow chart diagram.

Figure 1A:
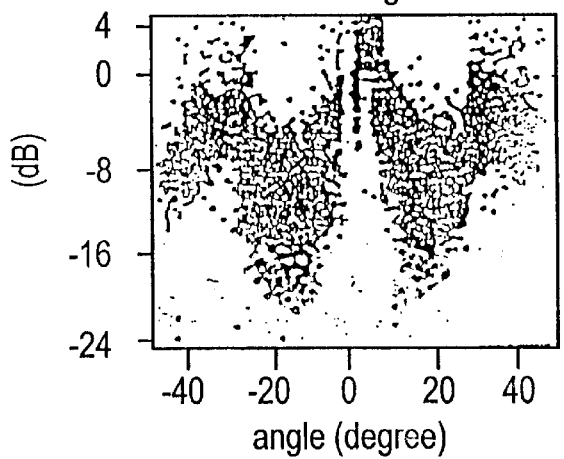
Figure 1B:
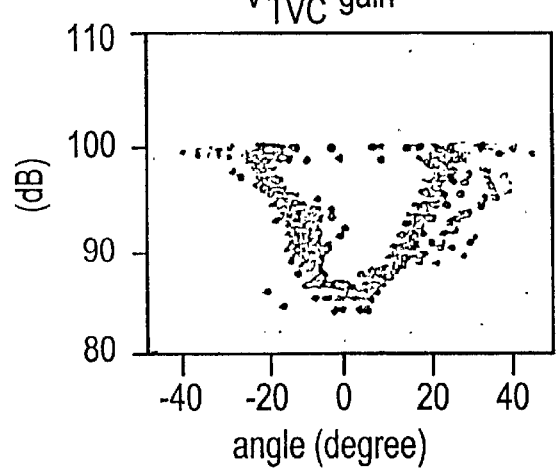
Figure 1C:
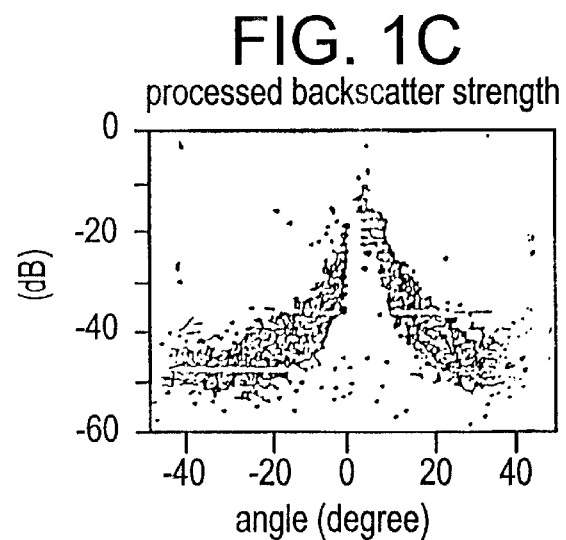
Figure 2:
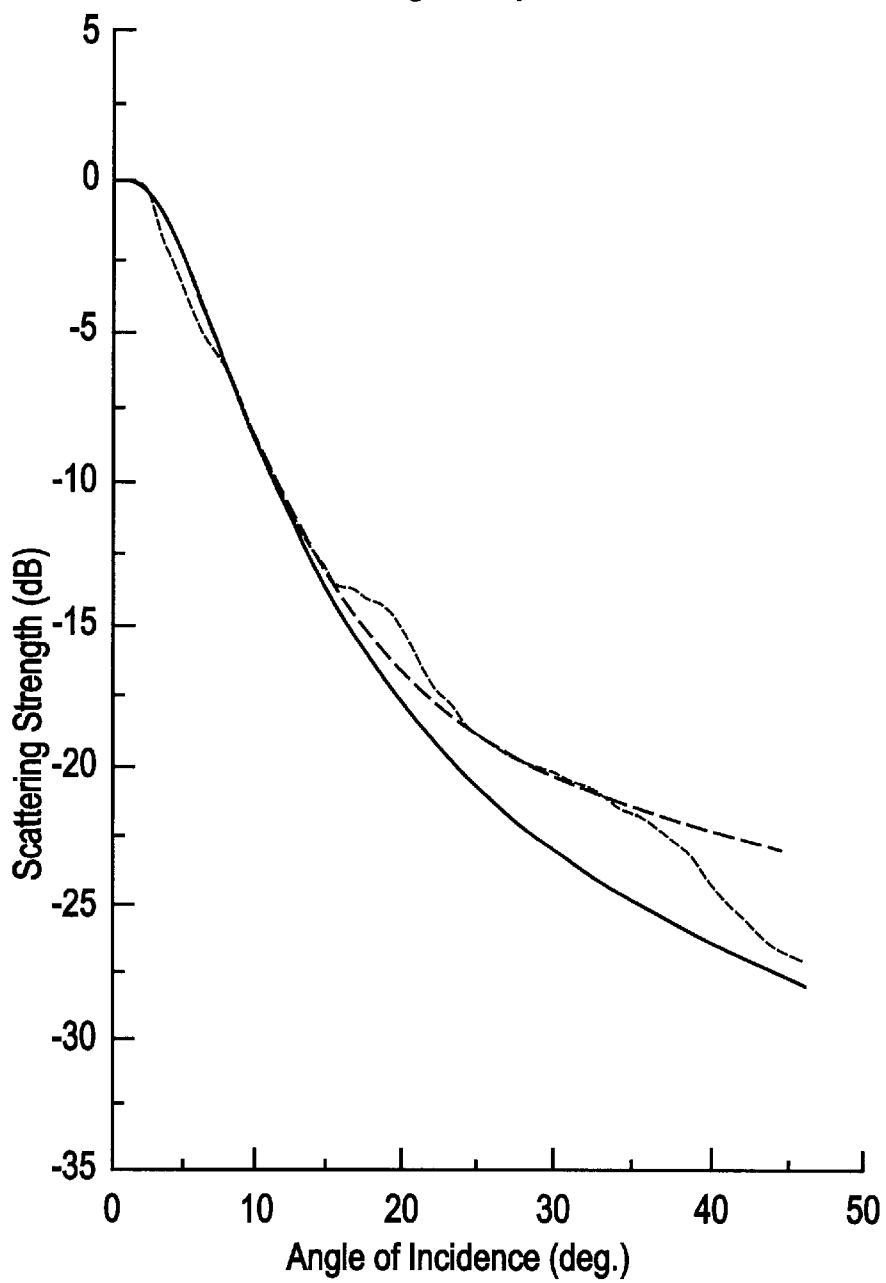
FIG. 2 represents a graph between Scattering Strength and the Angle of Incidence.
Figure 3A:
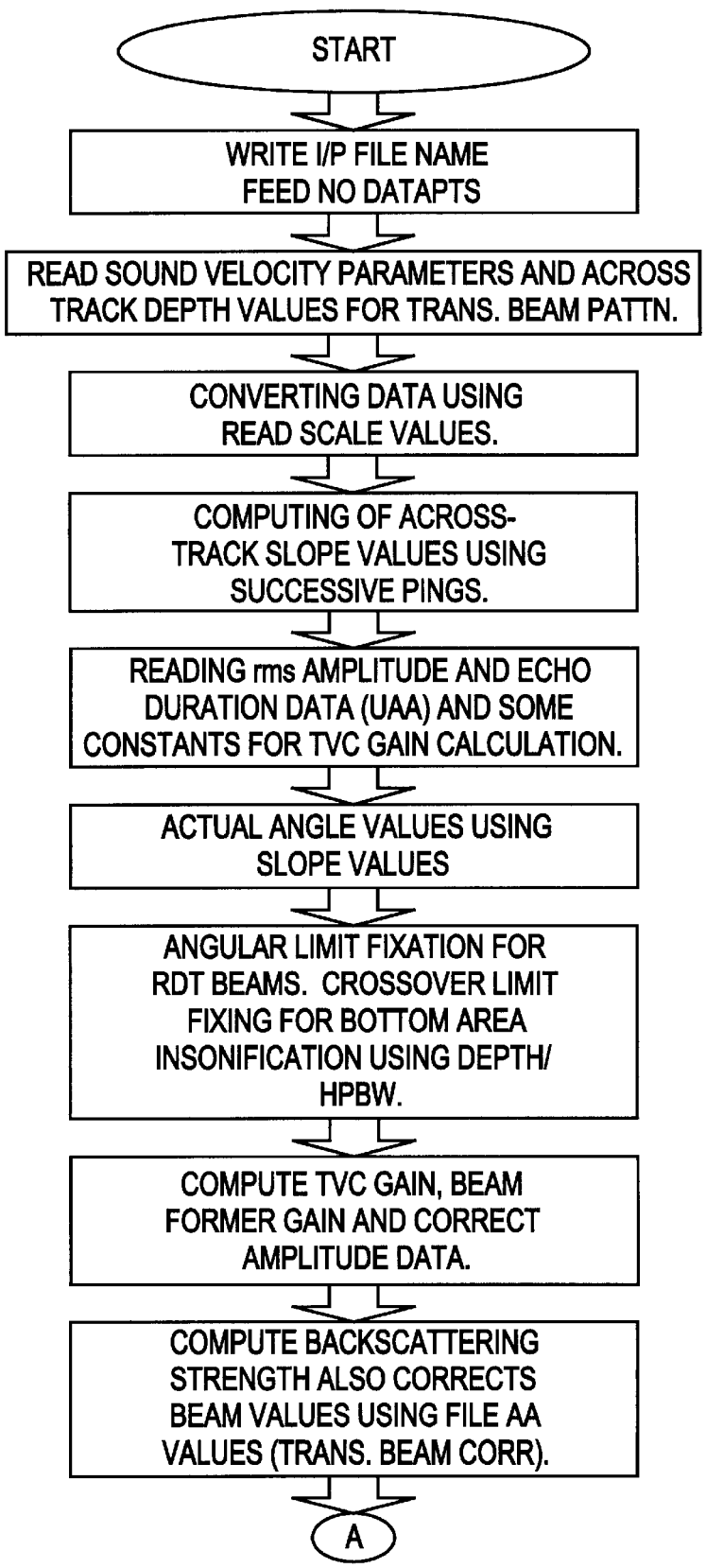

The invention is further illustrated in the following examples which are given by way of illustration and these should not be construed to limit the scope of the present invention.

EXAMPLE 1

Providing backscatter, Bathymetry and Multibeam Operational Parameters Obtained Using Multibeam Echosounder System There are three basic groups of parameters required for seafloor backscattering strength calculations: the equipment related constants (design constants), the variables related to the equipment's operating conditions, and bathymetry data measured by the system The multibeam backscatter system records all of these quantities and uses them in the backscatter computations. The primary backscatter parameters recorded by the system are the echo rms voltages and the signal duration's for each beam.

EXAMPLE 2

Removing System Gain from the Backscatter Data to Obtain Real Seafloor Backscatter Data The derivation of the seafloor acoustic backscattering from the raw rms echo energy value for each individual beam is carried out. The necessary gain corrections from receiving beams consist of matching circuits gain from each transducers group which is used for impedance matching between the array transducer elements. Range related gain i.e., the Time Varied Gain Correction ($V_{TVC}$) employed for beam's output include gain compensation due to signal travel through the water media and attenuation corrections. Sometimes signal loss due to signal striking to bottom is also being included Appendices (Anon., 1993). In (Anon., 1993), details regarding real time, $V_{TVC}$ is given. The computation of TVC gain is required only when real time TVC is calculated to meet system requirement. Under such situation it is necessary to determine TVC based gain based on operational conditions. In general, the term $V_{TVC}$ consists of starting gain ($V_0$), which includes: preamplifier gain ($V_y$), user selected TVC ($V_{corr}$), and system selected offset gain ($V_{off}$). The attenuation coefficient term ($\alpha_b$) used in water media is also stored in the multibeam's data record. The corresponding slant ranges (r*) for for spherical spreading, are known from given multiple depth values and lateral distances. The $V_{TVC}$ gain is being computed in real time using a suitable set of equations given in (Anon., 1993). The application of recorded lateral distance (l), and depth values (d), are used for slant range computations. Also mean sound velocity ($C_{mean}$) is also being taken from system record. The equation to compute slant range (one way) is given below:

$$r^* = (1500/C_{mean})^*(l^2+d^2)^{0.5} \tag{b.1}$$

Once slant range, r* is being known, the particular equation to compute gain $V_{TVC}$ (dB) is to be determined by use of the given equations's in (Anon, 1993). FIG. (1.*a*), presents measured $U_A$, angular rms electrical values for the areas of deeper water areas around Arabian Sea (Anon, 1999). The computed $V_{TVC}$ gain is also presented in FIG. (1.*b*) for same areas. The equations of Anon (1993), represents a model application of multibeam—Hydrosweep system TVC correction parameters used on-line.

The given beamformer's gain ($V_{BF}$) values in the measurement data record of the multibeam data records are being used to determine correction factor in dB. In the multibeam system receiving beam output from beamforming networks are being available in time multiplex mode and converted to analog form. In order to improve signal to noise ratio, these will subsequently be filtered in a narrow band filter. The filter gain ($V_{filt}$) in the filter module is also given in record. Each filter is designed as a band pass filter. The overall signal processing gain is given as:

$$V_{Tot} = V_{match} + V_{TVC} + V_{BF} + V_{filt} \tag{b.2}$$

EXAMPLE 3

Calculating Across Track Seafloor Slope Using Bathymetry Data in Order to Incorporatrate Correction Factor in Actual Beam Arrival Angles In addition to provide the necessary system gain information for each beam, we perform two more major correction essential for backscatter strength computations. First are geometric corrections using the system bathymetric data for the computations of bottom slopes across the ship's track. These slope angles are used to correct effective angles of arrival to obtain actual incidence angles from the seafloor. The along track beamwise depths are being recovered from measurement data records. Similarly, lateral distances between consecutive beams are also obtained from data. The bottom slope values with respect to each beam are computed using tangent inverse of the ratio between the consecutive depth and lateral distance difference.

EXAMPLE 4

Calculating Seafloor Area Based on Angle of Incidence and Bathymetry

Another important correction involves a calculation of the seafloor area insonified by each beam. The area insonified by each beam is less than the projected area for the same beam due to its pulse length dependence. In multibeam systems, for wide coverages, RDT (Rotational Directional Transmission) mode transmissions of three transmissions are carried out by beam steering techniques. As an example for a three transmission RDT mode techniques towards the −30°, 0°, and 30° directions, the transmission pulse length of xx ms (transmitted through 0° directions) is being effectively dominant within the angular range between −15° to +15°. The transmission pulse lengths of zz ms is being considered (i.e., addition of both the pulse lengths xx ms and yy ms towards the 0° and 30° directions respectively) due to their dominance within the beam angles between −30° to −15° towards portside. Similar transmissions towards, starboard side between the +30° to +15°, allows to consider pulse length of zz ms. The transmission pulse length of yy ms is dominant within the angular range of +45° to +30° port and −30° to −45° starboard side. These pulse lengths are being considered for insonification area calculation in RDT mode. These three pulse lengths ($\tau$) are also given in the multibeam data record. The expression to compute bottom area insonification is given below (Taltkdar and Tyce, 1991)

$$A = A_b \exp[-(\phi/\phi_x)^2] + A_p\{1 - \exp[-(\phi/\phi_x)^2]\} \tag{d.1}$$

$A_b$, is insonified area in beam limited region (near vertical) i.e., area due to $\phi_1$, and $\phi_2$, beamwidths towards x and y-axes respectively. $A_p$, area insonified in the pulse limited region i.e., outer beam region $\phi$ is the slope corrected incidence angle. The cross over angle, $\phi_x$ is the angle subtended by the depth right under the ship (d) and the slant range corresponding to (d+$C_{mean}\tau/2$). Hence, Ap, the area insonified in pulse limited region is given as: ($C_{mean} \tau X \phi_1$). Once, $A_b$, $A_p$, $\phi$, and $\phi_x$ values are known, A can be computed for each incidence angle.

EXAMPLE 5

Computing Measured Backscatter Strength Using Formulas (De Moustier and Alexandrou, 1991)

Once signal gain correction, slope corrections using actual beam scattering angle and bottom area insonification is carried out, the computation of the angular backscattering strength is necessary. Here, the expression to compute actual echo root mean square (rms) level (RL) is given below, $$<20 \log_{10} RL(\phi)> = SL + <10 \log_{10} S_B(\phi)> - 40*\log_{10}(R) - 2\alpha_i R + 10 \log_{10} A \tag{e.1}$$

where A is the insonification area and R is $\sqrt{d_{cent}^2 + l^2}$, wherein $d_{cent}$ is center beam depth. SL, is known as a source level. In the RDT mode, towards the port and starboard side beams beyond the preassigned transmission angle for example of +'15° the source level terms increased to be few dB rel. 1 $\mu$Pa, m more. <. . . > denotes ensemble averages.

The acquired uncorrected $U_A$, i.e., electrical input at bottom echo processor, can be rewritten as, $$<20 \log_{10} U_A(\phi)> = V_{Tot}(\phi) + <20 \log_{10} U_i(\phi)> \tag{e.2}$$

The term $V_{Tot}$ is known as a total gain at bottom echo processor i.e., computed gain factor. The received rms electrical signal ($U_i$) at the transducer terminal is given by, $$<20 \log_{10} U_i(\phi)> = <20 \log_{10} RL(\phi)> + G_{up} \tag{e.3}$$

The acoustic echo level (RL) can be determined when $U_A$, $V_{Tot}$ and $G_{up}$, are known. The term $G_{up}$ is receiving sensitivity in dB rel. 1V/μPa. Hence, acoustic echo level can be rewritten as, $$<20 \log_{10} RL(\phi)> = <20 \log_{10} U_A(\phi)> - V_{Tot}(\phi) - G_{up} \quad (e.4)$$

Once the RL is determined using equation (e.4). Replacing above equation in equation (e.1), and after rearrangement, the backscatter strength in dB is given $$<10 \log_{10} S_B(\phi)> = <20 \log_{10} RL(\phi)> - SL40 * \log_{10}(R) + 2\alpha_b R - 10 \log_{10} A \quad (e.5)$$

Once the backscattering coefficients are being computed, the transmission and receiving beampattern functions for RDT mode is required to be corrected. Here, given transmission beampatterns for a given multibeam-Hydrosweep system (Anon., 1993), are digitised and used for necessary corrections. However, no correction for receiving beams is being used in this work. The angular backscatter strength values (normalised with respect to the highest backscattering strength) are computed for deeper water (RDT mode) from Arabian Sea areas, which is being presented. FIGS. (1a–1c) provide $U_A$, $V_{TVC}$ and $S_B$ with respect to the angles for deeper water areas of Arabian Sea. Undulations are seen in the unprocessed raw backscatter data ($U_A$) in dB than the processed backscatter strength ($S_B$). FIG. (1b) from deep regions show Time varied gain ($V_{TVC}$) used by the system in real time.

Interestingly, the effect due to three beam transmission (RDT) is clearly seen in the raw backscatter data ($U_A$) of the deeper water RDT mode of the multibeam—Hydrosweep system [besides centre beam peak, availability of the peaks towards the transmission directions of ±30°]. A clear indication of the improvements in the data quality due to employed processing is observed. The presented backscattering strength data are free from any gain adjustment made by the system, and also corrected for bottom slopes.

Also, the processed backscattering strength values are normalized due to bottom insonification area and useful for angular backscatter modeling work to infer bottom characterizations related to seafloor roughness and materials.

EXAMPLE 6

Averaging and Bining in 1° and Backscatter Data to Obtain Backscatter Strength Data at 1° Angle The measured backscattering strength (dB) for each beam has been binned in 1° angular bins for original roll compensated beam directions and averaged over the number of samples in each bin for study areas. Measured backscattering strengths values are obtained covering from 0° incidence angles to system provided outer beams at an interval of 1° (FIG.: 2). Now, these values are corrected for system gain, seafloor slope, and seafloor area normalization.

EXAMPLE 7

Reading 13 Point Measured Backscatter Strength Data (3°–15°) Angle and Subjected it to Curve Fitting as Required in Said Model to Obtain Power Law Parameters The backscattering strength should be symmetric about the normal incidence angle (especially for flat bottom) if the seafloor roughness has homogenous properties. Comparatively, fluctuations in the near vertical backscattering strengths are significant for rough seafloor areas. The backscatter data fluctuate more near normal incidence even for moderately rough bottom. The fluctuation is prominent for rough bottom up to the range of twice the half-power beamwidths of the imaging system, which is 3° for any modern multibeam system (because, the half-power beamwidths of the center beam of the existing high resolution multibeam system is 1.5°). Significant bias in the roughness parameter occurs if near normal incidence undulated backscatter values are considered for curve fitting. Therefore, in order to determine interface roughness parameters of the seabed by backscatter curve fitting, a Helmholtz-Kirchhoff approximation from 3°–15° incidence angle is effectively used. In this situation, backscatter data in the range from 3° to 15° is used for the presently studied seafloor areas.

In order to determine quantitative seafloor interface roughness parameters like power spectral parameters using the composite roughness theory (Jackson et. al., 1986), the near normal incidence angular beam ranges (3°–15°) are used for curve fitting. Here, an approach is made which is based on the minimum mean squared error criteria within the measured and theoretically computed backscatter values for the angular region between 3° to 20°. The range of γ is chosen between 0.5 and 1.0, and β varies from $10^{-5}$ to 0.100. The error term is computed for a fixed value of β (starting from the lowest value), and α (γ/2−1) is varied between 0.5 to 1.0. The same process is continued with different values of β until a minimum error value is obtained. A visual examination (qualitative) of the theoretical and experimental curves is also made to confirm the accuracy of α, and β.

EXAMPLE 8

Using the Backscatter Data in Step 7 in a Seafloor Roughness Power Law Parameter Model For isotropic roughness and Gaussian statistics, the interface backscattering coefficient is given by $$\sigma_s(\theta_g) = \frac{g^2(\Pi/2)}{8 \cdot \Pi \mathrm{Sin}^2\theta_g \mathrm{Cos}^2\theta_g} \int_0^\infty \exp(-qu^{-2\alpha}) J_0(u) u\, du \quad (h.1)$$

where $$q = \mathrm{Sin}^2\theta_g \, \mathrm{Cos}^{-2\alpha}\theta_g \, C_h^2 2(1-2\alpha) K_a^{2(1-\alpha)} \quad (h.2)$$

g is the plane wave reflection coefficient at normal incidence which is given by $$g(\Pi/2) = (\rho v - 1)/(\rho v + 1.) \quad (h.3)$$

v is the ratio of the sediment compressional wave speed to the sound speed in the overlying water. ρ is the ratio of the densities of the sediment to seawater. $K_a$ is the acoustic wavenumber and $J_0$ is the zeroth order Bessel function of the 1st kind. $C_h^2$ is a parameter depending on the interface roughness parameters α, β

$$C_h^2 = [2\Pi\beta\Gamma(2-\alpha)2^{-2\alpha}]/[\alpha(1-\alpha)\,\Gamma(1+\alpha)] \quad (h.4)$$

The terms α,β are related to the bathymetric power spectrum (W). Using the relations $$W(k) = \beta k^{-\gamma} \quad (h.5)$$

where k is the spatial wave number and already mentioned γ[=2(α+1)]. Eqn's (h.1) and others are used for the determination of the power spectral parameters of the seafloor interface scattering strength determination. As already mentioned that the curve fitting technique employed between the computed backscattering strength using power spectral based H-K theory with the acquired angular multibeam data,

EXAMPLE 9

Splicing of Multibeam Backscatter Data Using the Helmholtz-Kirchhoff and Rayleigh-Rice Theories Application of the splicing technique used at 20° incidence angle is very important component of the composite roughness theory. A splicing technique is used at incidence angle of 20° to combine both the theories, and a shadowing term is also included. Using estimated power law parameters, large-scale root mean square (rms) slope value is computed:

$$s^2 = (2\pi\gamma k_c^{4-\gamma})/(4-\gamma) \quad (i.1)$$

$k_c$ is the cutoff wave number or Bragg wave number. If computed rms slope value is <0.1, at Bragg wave number ($2 k_a \cos\theta_g$) {where $k_a$ is operational wave number of the system and $\theta_g$ is grazing angle [~(90°−θ)], and angle, θ is known as an incidence angle} for a grazing angle of 70° at multibeam operational frequency. In this paper, the slope angle is presented in the units of radian. In order to achieve splicing between the two theories, the use of this slope angle value (<0.1) is required to be averaged. The small scale backscattering strength $\sigma_s(\theta_g)$ is represented as (Jackson et. al., 1986)

$$\sigma_s(\theta_g) = 4K_a^4 \sin^4\theta_g f(\theta_g, \rho, v) W(2K_a \cos\theta_g) \quad (i.2)$$

$f(\theta_g,\rho,v)$ is a function for fluid—fluid boundary, which changes with grazing angle, ρ, and v. The value of $f(\theta_g,\rho,v)$ changes significantly at a critical angle, $\theta_c = \cos^{-1}(1/v)$. The term $f(\theta_g,\rho,v)$, is expressed as $$f(\theta_g, \rho, v) = \begin{cases} [(\rho-1)^2\cos^2\theta_g + \rho^2 - v^2]^2 / \\ \quad [\rho\sin\theta + (v^{-2} - \cos^2\theta_g)^{0.5}]^4 \text{ if } \theta_g > \theta_c \\ \text{or} \\ [(\rho-1)^2\cos^2\theta_g + \rho^2 - v^{-2}]^2 / \\ \quad [(1-\rho^2)\cos^2\theta_g + \rho^2 - v^{-2}]^2 \text{ if } \theta_g < \theta_c \end{cases} \quad (i.3)$$

As mentioned that the small-scale backscattering cross section is obtained by averaging it over the large scale bottom slopes s with the rms (root mean square) slope for the composite roughness model, $$\sigma_s(\theta_g) = [R(\rho_g, s)/\Pi^{0.5} s] \int_{-\theta_g}^{\infty} \sigma_s(\theta_g, s') \exp(-s'^2 s^{-2}) ds' \quad (i.4)$$

The shadowing term is defined as, R $(\theta_g,s) = (2\ Q)^{-1}(1-e^{-2Q})$. The other term, Q is given by: $Q = (\frac{1}{4}t)[\Pi^{0.5}e^{-t}-t(1-\text{erf } t)]$, where $t = s^{-1}\tan\theta_g$, and erf is the error function. However, a mismatch between the theories are generally observed for higher rms slope angle (>0.1) at a Bragg wave number. Under this situation, it is suggested to shift the wave number towards the lower values of rms slope (~0.1), and use of such slope angle for averaging of the said expression would provide proper splicing, and this part of the splicing technique within the extended composite roughness method is known as filtering techniques.

which gives seabottom interface roughness power spectral parameters (α,β).

EXAMPLE 10

Inclusion of Sediment Volume Roughness Model by Once Again Curve Fitting of Entire Measured Angular Backscatter Strength Data Verifing the Validity of the Composite Roughness (Jackson et. al., 1986) Model, which is Reflected by Matching of the Theoretical Curve with the Measured Backscatter Data After necessary splicing technique to combine the theories are employed, it is essential to determine sediment volume roughness parameters. The volume scattering term for heavily sedimented seafloor is also necessarily included. The term, $k_c$ is the cut—off wave number. The volume scattering term, as given in Jackson et. al. (1986) is $$\sigma_{vs}(\theta_b) = \frac{5\sigma_v[1 - g^2(\theta_g)]^2 \sin^2\theta_g}{\alpha_b \ln 10 \sin(\theta_g)} \quad (j.1)$$

In the above expression, $\rho_{vs}$ is the volume scattering cross-section for small-scale. $\alpha_\beta$ is the sediment attenuation coefficient which is expressed in (dB/unit length). The angle made by a refracted acoustic ray at the interface is $\theta_b = \sin^{-1}\sqrt{[1-(v\cos\theta_g)^2]}$. The ratio term, $\rho_v/\alpha_b$ is used as a free parameter in the above expression. The validity of this expression lies in the single scattering regime. It is possible only when the parameter $(\rho_v/\alpha_b)$ is selected to be less than 0.004. The volume scattering term is used for incidence angles between 0° and 45°, and integration is performed. The overall scattering term is obtained by summing the interface and volume contributions.

Quantitative model based seafloor roughness characterization and demarcation has importance in following applications:

a) Manganese nodule exploration research: Determination of manganese nodule abundance parameters and related seafloor roughness data support to develop exploitation strategies is possible. Roughness parameters are useful for designing of mining systems. Study results from Central Indian Ocean manganese module areas are given in table 1. The computed power law parameters γ and β are obtained using the curve fitting between the near normal incidence (3–15°) area backscatter strength values and Helmholtz-Kirchoff's theory (within the composite roughness theory), which is a function of the power law parameters. A critical examination of the results indicate practically no relation among the nodule abundance and the 'α' parameters. Except for a single area of medium nodule abundance (6.8 kg/m²), the values are almost constant. Whereas, the 'β' parameter of the power law, reveal higher values beyond the nodule abundance of 11.0 kg/m². The higher values of the α and/or β parameter generally indicate higher bottom roughness. However, the overall effect of these two terms on the roughness of the bottom is reflected in the term $C_h r^\alpha$ rms height difference between the two points at the 100 m. the computed rms height difference at a horizontal distance of 100 m between the points reveal significantly lower values for the low to higher nodule abundance. Except for medium nodule abundance of 6.8 kg/m², the estimated rms height difference is significantly high (9.47 m). Similarly, computed rms large-scale slope values (S) also show similar results. The large-scale slope value is found to be significantly highest for the medium abundance nodule (6.8 kg/m²). Another large-scale bottom roughness parameter (radius of curvature) (R) is computed using the estimated power law parameters, which support the study results related to large-scale roughness. The small-scale rms relief height ($h_g$) has also been presented (in cm scale). The values of the small-scale rms height were found to be relatively low starting for the low to higher abundance (up to 11 kg/m$^2$). However, small-scale relief heights are obtained to be the highest for the higher nodule abundance. The ratio parameter between the volume backscattering strength and the sediment attenuation co-efficient ($\rho_{vs}/\alpha_b$) reveals significantly low values, which indicate no sediment inhomogeneity in these nodule-bearing areas.

TABLE 1

Computed roughness parameters from central Indian Ocean Nodule field

| Abundance (kg/m$^2$) | α | β | $C_h r^a$ | s | $H_s$ | R | $\sigma_{vs}/\alpha_b$ |
|---|---|---|---|---|---|---|---|
| 6.80 | 0.72 | 0.005 | 9.47 | 0.210 | 0.20 | 15.69 | 0.0000 |
| 7.00 | 0.51 | 0.005 | 0.86 | 0.144 | 0.22 | 18.53 | 0.0004 |
| 9.80 | 0.50 | 0.007 | 0.93 | 0.168 | 0.26 | 15.78 | 0.0011 |
| 9.40 | 0.51 | 0.005 | 0.88 | 0.144 | 0.22 | 18.53 | 0.0070 |
| 10.2 | 0.51 | 0.005 | 0.88 | 0.144 | 0.22 | 18.53 | 0.0020 |
| 11.0 | 0.51 | 0.007 | 0.93 | 0.168 | 0.26 | 15.78 | 0.0007 |
| 12.0 | 0.52 | 0.014 | 1.64 | 0.246 | 0.36 | 10.99 | 0.0003 |
| 12.9 | 0.52 | 0.014 | 1.64 | 0.246 | 0.36 | 10.99 | 0.0016 | b) Ridge research: Understanding the ridge system i.e., determining roughness parameters for younger and older crusts characterization of rift valley is possible.
c) Coastal zone management: Research using combined airborne synthetic aperture radar and acoustically imaged data (multibeam and side scan sonar) are up coming. Understanding of the relationship between the tectonic lineaments and sediment transport subadjacent seabed using proposed technique by estimation of quantitative roughness parameters is possible.
d) Defense applications; In order to determine characteristics of seafloor boundaries (roughness) for SOFAR channel studies which subsequently be useful for long(, range communications.
e) Real time applications: It can be used for real time applications as a solution for geological sampling decision.

What is claimed is:

1. A method for determining sea floor roughness using multibeam echosounder, comprising the steps of:
   i. providing backscatter, bathymetry and multibeam operational parameters;
   ii. removing system; gain from the backscatter data to obtain real seafloor backscatter data;
   iii. calculating across track seafloor slope;
   iv. incorporating correction factor in actual beam arrival angles;
   v. calculating seafloor area;
   vi. measuring backscatter strength;
   vii. obtaining backscatter strength data at 1° angle;
   viii. obtaining power; law parameters;
   ix. using the above-obtained parameters in a seafloor roughness power law model;
   x. splicing the multibeam backscatter data;
   xi. including sediment volume roughness model; and
   xii. verifying the validity of the composite roughness model.

2. A method as claimed in claim 1, wherein the primary backscatter parameters recorded by the system are echo rms voltage and signal duration for each beam.

3. A method as claimed in claim 1, wherein the across track seafloor slope is calculated using bathymetry data.

4. A method as claimed in claim 1, wherein the across track seafloor slope is calculated to incorporate correction factor in actual beam arrival angles.

5. A method as claimed in claim 1, wherein the bottom slope values with respect to each beams are computed using tangent inverse of the ratio bet ween depth and lateral distance difference.

6. A method as claimed in claim 1, wherein the seafloor area is calculated based upon angle of incidence and bathymetry.

7. A method as claimed in claim 1, wherein the bottom sea surface area is calculated using the formula:

$$A = A_b \exp[-(\phi/\phi_x)^2] + A_p \{1 - \exp[-(\phi/\phi_x)^2]\}.$$

8. A method as claimed in claim 1, wherein the actual echo root mean square level is calculated using DeMoustier and Alexandrou Formula:

$$<20 \log_{10} RL(\phi)> = SL + <10 \log_{10} S_B(\phi)> - 40 * \log_{10}(R) - 2\alpha_b R + 10 \log_{10} A.$$

9. A method as claimed in claim 1, wherein the backscatter strength data at 1° angle is obtained by bining each beam at 1° angular bins and averaging the number of samples in each bin for steady areas.

10. A method as claimed in claim 1, wherein the power law parameters are obtained by reading the measured backscatter data and subjecting it to curve fitting.

11. A method as claimed in claim 1, wherein Helmholtz-Kirchhoff approximation is used to determine interface roughness of the seabed.

12. A method as claimed in claim 1, wherein the splicing is done using Helmholtz-Kirchoff and Rayleigh-Rice theories.

13. A method as claimed in claim 1, wherein the incidence angle of 20° is used for splicing.

14. A method as claimed in claim 1, wherein the sediment volume roughness model is created by curve fitting the entire measured angular backscatter data.

15. A method as claimed in claim 1, wherein the verification is done by matching the theoretical curve with the measured backscatter data.

* * * * *